United States Patent
Hamajima et al.

(10) Patent No.: US 7,377,970 B2
(45) Date of Patent: *May 27, 2008

(54) WATER-BASED INK SET FOR INK-JET RECORDING AND INK-JET RECORDING METHOD

(75) Inventors: Tomoyo Hamajima, Nagoya (JP); Narumi Kawai, Nagoya (JP); Narumi Koga, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,944

(22) Filed: Jul. 20, 2006

(65) Prior Publication Data

US 2007/0046751 A1 Mar. 1, 2007

(30) Foreign Application Priority Data

Aug. 26, 2005 (JP) ............................. 2005-246881

(51) Int. Cl.
*C09D 11/00* (2006.01)
*C09D 11/02* (2006.01)
*B41J 2/01* (2006.01)

(52) U.S. Cl. .................. 106/31.27; 106/31.6; 347/100
(58) Field of Classification Search ............. 106/31.27, 106/31.6; 347/100
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 6,843,840 | B2 * | 1/2005 | Kataoka et al. ............ 106/31.6 |
| 7,223,300 | B2 * | 5/2007 | Chevli ..................... 106/31.27 |
| 2005/0235867 | A1 * | 10/2005 | Jackson et al. .......... 106/31.27 |
| 2005/0284329 | A1 * | 12/2005 | Jackson et al. ............ 106/31.6 |
| 2006/0119681 | A1 * | 6/2006 | Sugimoto et al. ........... 347/100 |
| 2006/0132567 | A1 * | 6/2006 | Kawai et al. ............... 347/100 |
| 2006/0132810 | A1 * | 6/2006 | Hamajima et al. .......... 358/1.9 |
| 2006/0238589 | A1 * | 10/2006 | Koga et al. ................. 347/100 |
| 2007/0046749 | A1 * | 3/2007 | Kawai et al. ............... 347/100 |
| 2007/0046750 | A1 * | 3/2007 | Kawai et al. ............... 347/100 |
| 2007/0046752 | A1 * | 3/2007 | Hamjima et al. ........... 347/100 |
| 2007/0101900 | A1 * | 5/2007 | Wheeler et al. .......... 106/31.27 |
| 2007/0107626 | A1 * | 5/2007 | Chevli ..................... 106/31.27 |

FOREIGN PATENT DOCUMENTS

| JP | 1095093 | 4/1989 |
| JP | 2127482 | 5/1990 |
| JP | 8003498 | 1/1996 |
| JP | 2000-513396 | 10/2000 |

* cited by examiner

*Primary Examiner*—Helene Klemanski
(74) *Attorney, Agent, or Firm*—Reed Smith LLP

(57) ABSTRACT

A water-based ink set for ink-jet recording is provided which is capable of: reducing graininess in a low-density printed part without reducing the color reproduction range in red and magenta directions in a high-density printed part; extending the color reproduction range in the red direction; improving the vividness of the red color; and improving the light fastness and gas resistance. The water-based ink set for ink-jet recording includes a magenta pigment ink and a red dye ink. The magenta pigment ink is a light magenta pigment ink having a lightness (L*) of about 50 or more in the L*a*b* colorimetric system.

12 Claims, No Drawings

WATER-BASED INK SET FOR INK-JET RECORDING AND INK-JET RECORDING METHOD

BACKGROUND OF THE INVENTION

1. Field of the Invention

The present invention relates to a water-based ink set for ink-jet recording suitable for reducing graininess in a low-density printed part, for extending a color reproduction range, for improving light fastness and for improving gas resistance. The present invention also relates to an ink-jet recording method using this water-based ink set for ink-jet recording.

2. Description of the Related Art

When a color image is formed by use of an ink-jet recording method, a three-color ink set has been generally used which is composed of a yellow ink (Y), a magenta ink (M) and a cyan ink (C). Alternatively, a four-color ink set has also been used in which a black ink (K) is further added to the three-color ink set.

Generally, in an ink-jet recording method, the gradation of an image is controlled by adjusting the density of dots formed by ejecting ink onto a recording material. However, when the gradation is controlled by such a method, the dot density decreases in a low-density printed part. Relative to this, the individual dots become easily discernable to the eye, thereby causing a problem that the image is grainy.

In view of the above, a method has been proposed in which two or more inks are employed as cyan ink (see Japanese Patent Application Laid-Open No. H01-95093). In this method, these inks have different dye concentrations and are composed of different kinds of dyes. In addition, a dye which is excellent in vividness but inferior in light fastness is employed in a dark color ink, and a dye which is excellent in light fastness but inferior in vividness is employed in a light color ink. Moreover, a similar method has been proposed for magenta ink (see Japanese Patent Application Laid-Open No. H02-127482). According to these methods, graininess can be improved, but a problem remains that a color reproduction range cannot be extended. Further, when dye ink is employed, color fading first occurs in a low-density printed part, and only the low-density printed part becomes whitish. Thus, the color tone of the image is changed, and the density difference of the image becomes excessively large to cause the overall image balance to be lost. Therefore, gas resistance, particularly ozone resistance, of a printed part is important.

Generally, in a three-color ink set composed of yellow, magenta and cyan inks, and also in a four-color ink set in which a black ink is added to the three-color ink set, red color is developed by use of the magenta ink and the yellow ink. When these two inks are used to develop red color as above, a problem arises that sharp printing quality and vivid colors are difficult to achieve due to a landing error of superposition.

SUMMARY OF THE INVENTION

The present invention has been made to solve the above-mentioned problems. Objects of the present invention are, in an ink-jet recording method:

(i) to reduce graininess in a low-density printed part in a magenta direction without reducing the color reproduction range in the magenta direction in a high-density printed part and with minimizing the number of inks composing an ink set;

(ii) to extend the color reproduction range in a red direction and to enhance vividness;

(iii) to improve light fastness in the magenta and red directions; and (iv) to improve gas resistance in the magenta and red directions.

The present inventors have conducted extensive studies on a water-based ink set for ink-jet recording. The studies are based on the hypothesis that the lightness ($L^*$), the hue angle (h) and the chroma ($C^*$) of the inks constituting the ink set are closely related to reducing graininess in a low-density printed part of a color image and to extending a color reproduction range. Here, the lightness ($L^*$), the hue angle (h) and the chroma ($C^*$) are based on $L^*a^*b^*$ colorimetric system. Consequently, the present inventors have found that, in a water-based ink set for ink-jet recording having a magenta ink, the above-mentioned objects (i), (ii) and (iii) can be achieved by employing a light magenta pigment ink as the magenta ink and also employing a red ink (e.g., red dye ink). This light magenta pigment ink employs pigment as a coloring agent, has a lightness ($L^*$) of a specific value or more, and is employed in place of a normal magenta ink employed in a conventional ink set. Also, the red dye ink employs dye as a coloring agent. Thus, the present invention has been completed.

Accordingly, the present invention provides a water-based ink set for ink-jet recording comprising a magenta pigment ink employing pigment as a coloring agent and a red dye ink employing dye as a coloring agent. This ink set is characterized in that the magenta pigment ink is a light magenta pigment ink having a lightness ($L^*$) of about 50 or more in the $L^*a^*b^*$ colorimetric system.

In addition, the present invention provides an ink-jet recording method employing the above-mentioned water-based ink set for ink-jet recording.

The water-based ink set for ink-jet recording of the present invention comprises, as a magenta ink, a light magenta ink which contains a low concentration of coloring agent. Therefore, when ink-jet recording is performed by use of this ink set, the graininess of a low-density printed part in a magenta direction can be reduced.

Also, since the coloring agent of the light magenta ink is pigment, excellent light fastness and gas resistance can be obtained in a printed part in the magenta direction, and color fading and discoloration can be prevented even when the density of magenta color is low.

In addition, this light magenta pigment ink may be ejected on a red-printed part. In this manner, light fastness and gas resistance in a red direction can be improved with little change in the hue of red color.

Further, the ink set of the present invention comprises the red dye ink together with the light magenta pigment ink. Therefore, by employing the red ink together with the light magenta pigment ink in a magenta-printed part, the color reproduction range in the magenta direction is prevented from being reduced in a high-density printed part. In addition, the color reproduction range in the red direction is significantly extended, and the vividness of red color is improved. This improvement of the vividness of red color is achieved, since red color is not developed by color mixing of a magenta ink and a yellow ink but can be developed by the red dye ink alone.

Moreover, since the ink employed for developing red color is a dye ink, colors in the range from magenta to red can be reproduced with higher chroma.

In short, according to the ink set of the present invention, the following effects can be attained by use of the two inks including the light magenta pigment ink and the red dye ink: the reduction of graininess in a low-density printed part in the magenta direction; the prevention of the reduction of the color reproduction range in the magenta direction in a high-density printed part; the significant extension of the color reproduction range in the red direction; the improvement of the vividness of red color; and the improvement of light fastness and gas resistance in printed parts in the magenta and red directions.

Therefore, according to the ink set of the present invention, color reproducibility, print quality, light fastness and gas resistance can be improved in a color image formed by an ink-jet recording method.

Generally, red color is the second most frequently used color next to black color upon text printing. According to the present invention, since text in red color is not printed with the superposition of two inks but can be printed with the single red ink, excellent color developing properties and sharp print quality with suppressed feathering can be achieved.

DETAILED DESCRIPTION OF THE PREFERRED EMBODIMENTS

The present invention will next be described in detail.

In the present invention, lightness (L*), hue angle (h) and chroma (C*) are defined based on the L*a*b* colorimetric system standardized by the Commission International de l'Eclairage (CIE) in 1976. This colorimetric system is also defined in Japanese Industrial Standards (JIS Z 8729).

In the present invention, the lightness (L*) is a lightness value in an object solidly printed at a resolution of 1200× 1200 dpi with each of the inks on glossy paper and is obtained by means of a spectrocolorimeter or a similar apparatus. Also, the hue angle (h) and the chroma (C*) are the respective values in the same solidly printed object. In this case, first, color indices (a* and b*) are obtained by means of a spectrocolorimeter or a similar apparatus, and the hue angle (h) and the chroma (C*) are calculated from the following equations (1) and (2) using the obtained a* and b*.

$$C^* = \sqrt{(a^*)^2 + (b^*)^2} \quad \text{Equation (1)}$$

$$h = \tan^{-1}\left(\frac{b^*}{a^*}\right) (\text{when } a^* \geq 0 \text{ and } b^* \geq 0) \quad \text{Equation (2)}$$

$$h = 360 + \tan^{-1}\left(\frac{b^*}{a^*}\right) (\text{when } a^* \geq 0 \text{ and } b^* < 0)$$

$$h = 180 + \tan^{-1}\left(\frac{b^*}{a^*}\right) (\text{when } a^* < 0)$$

The "glossy paper" employed in the measurement of the L*, a* and b* values is paper having a coat layer for surface smoothness provided on base paper (body paper). Specific examples of the glossy paper include KASSAI (a registered trade mark) glossy finishing (product of FUJI Photo Film Co., Ltd.), ink-jet printer paper (glossy paper, product of KOKUYO Co., Ltd.), thick glossy paper (product of Kodak Co., Ltd.) and the like. The term "object solidly printed at a resolution of 1200×1200 dpi" refers to an area which is printed at a resolution of 1200×1200 dpi so as to be fully covered with ink. An ink-jet printer is employed for printing, and examples of the ink-jet printer include a digital multi-function device equipped with an ink-jet printer (MFC-5200J, product of Brother Industries, Ltd.) and the like. Examples of the spectrocolorimeter which can be used include Spectrolino (product of Gretag Macbeth) and the like. The measurement is performed by use of a light source $D_{65}$ at a viewing angle of 2°.

The water-based ink set for ink-jet recording of the present invention comprises a magenta pigment ink and a red dye ink, and is characterized in that the magenta pigment ink is a light magenta pigment ink having a lightness (L*) of 50 or more. Therefore, a normal magenta ink having a lightness (L*) of less than 50 is not included in the ink set of the present invention. If this normal magenta ink having a lightness (L*) of less than 50 is employed as the magenta ink, graininess is noticeable in a low-density printed part in the magenta direction. Thus, this normal magenta ink is not preferable as the magenta ink.

Preferably, the light magenta pigment ink constituting the ink set of the present invention has a lightness (L*) of about 50 or more and about 65 or less. The light magenta pigment ink having a lightness (L*) exceeding about 65 is not preferable, since the original magenta color is difficult to reproduce.

Preferably, the hue angle (h) of the light magenta pigment ink is adjusted within the ranges of from about 335° to about 360° or from about 0° to about 5°. If the hue angle (h) is not within this range, magenta color is not satisfactorily developed.

Further, preferably, the chroma (C*) of the light magenta pigment ink is adjusted within the range of from about 65 to about 90. By adjusting the chroma (C*) within this range, magenta color can be reproduced vividly.

Preferably, the red dye ink constituting the ink set of the present invention has a lightness (L*) of about 50 or less. The red dye ink having a lightness (L*) exceeding about 50 is not preferable, since it is difficult to obtain a sufficient color reproduction range in the red direction. More preferably, the lightness (L*) of the red dye ink falls within the range of from about 25 to about 50. By adjusting the lightness (L*) of the red dye ink within this range, red and magenta colors can be reproduced at a satisfactory density.

Preferably, the hue angle (h) of the red dye ink is adjusted within the range of from about 20° to about 35°. By adjusting the hue angle (h) within this range, red color can be satisfactorily developed.

Further, preferably, the chroma (C*) of the red dye ink is adjusted within the range of from about 80 to about 90. By adjusting the chroma (C*) within this range, vivid red color can be developed.

Further, the ink set of the present invention may include any ink in addition to the light magenta pigment ink and the red dye ink. For example, a yellow ink and/or a cyan ink may be included in the ink set. A black ink may be included in accordance with need. A full color image can be reproduced by including the yellow ink, the cyan ink, and, if necessary, the black ink in addition to the light magenta pigment ink and the red dye ink.

If the cyan ink is included in the ink set of the present invention, a normal cyan ink employed in a known ink set may be employed as the cyan ink. However, preferably, a light cyan ink having a lightness (L*) of about 60 or more is employed in place of the normal cyan ink, and a blue ink and/or a green ink are/is also employed. In this case, a normal cyan ink having a lightness (L*) of less than about 60 is unnecessary. By employing the light cyan ink having a lightness (L*) of about 60 or more as the cyan ink, graininess can be reduced in a low-density printed part in the cyan direction. Preferably, the lightness (L*) of the light cyan ink falls within the range of from about 60 to about 85.

The light cyan ink having a lightness (L*) exceeding about 85 is not preferable, since the original cyan color is difficult to reproduce.

Preferably, the hue angle (h) of the light cyan ink is adjusted within the range of from about 215° to about 255°. If the hue angle (h) is not set in this range, it is difficult to satisfactorily develop cyan color.

Further, preferably, the chroma (C*) of the light cyan ink is adjusted within the range of from about 40 to about 70. By adjusting the chroma (C*) within this range, cyan color can be reproduced vividly.

Preferably, the blue ink constituting the ink set of the present invention together with the light cyan ink has a lightness (L*) of about 45 or less. If the lightness (L*) of the blue ink exceeds about 45, it is difficult to obtain a sufficient color reproduction range in the blue direction. More preferably, the lightness (L*) of the blue ink falls within the range of from about 35 to about 45. By adjusting the lightness (L*) of the blue ink within this range, blue and cyan colors can be reproduced at a satisfactory density.

Preferably, the hue angle (h) of the blue ink is adjusted within the range of from about 270° to about 285°. By adjusting the hue angle (h) within this range, blue color can be satisfactorily developed.

Further, preferably, the chroma (C*) of the blue ink is adjusted within the range of from about 70 to about 80. By adjusting the chroma (C*) within this range, blue color can be reproduced vividly.

Preferably, the green ink constituting the ink set of the present invention together with the light cyan ink has a lightness (L*) of about 60 or less. If the lightness (L*) of the green ink exceeds about 60, it is difficult to obtain a sufficient color reproduction range in the green direction. More preferably, the lightness (L*) of the green ink falls within the range of from about 35 to about 60. By adjusting the lightness (L*) of the green ink within this range, green and cyan colors can be reproduced at a satisfactory density.

Preferably, the hue angle (h) of the green ink is adjusted within the range of from about 175° to about 215°. By adjusting the hue angle (h) within this range, green color can be satisfactorily developed.

Further, preferably, the chroma (C*) of the green ink is adjusted within the range of from about 60 to about 80. By adjusting the chroma (C*) within this range, green color can be reproduced vividly.

Furthermore, at least one of the coloring agents of the light cyan ink and the blue ink and/or the green ink may be employed a pigment.

If a yellow ink or a black ink is included in the ink set of the present invention, an ink employed in a known ink set may be employed as these inks. For example, a normal yellow ink having the hue angle (h) of from about 70° to about 140° may be employed as the yellow ink.

Each of the inks constituting the ink set of the present invention contains a coloring agent, water and a water soluble organic solvent so as to have L*, h and C* of the predetermined values described above.

Water soluble dye or pigment may be employed as the coloring agent contained in the inks. A proper combination of these may be employed to adjust the inks to have the predetermined color.

Typical examples of the water soluble dye employed include direct dyes, acid dyes, basic dyes, reactive dyes and the like. Also, examples of the preferable water soluble dye include, in view of a chemical structure, azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like. Particularly, examples of the water soluble dye which is suitable as the ink for an ink-jet recording method and satisfies the required properties such as vividness, water solubility, stability and light fastness include, but are not limited to: direct dyes such as C. I. Direct Yellows 12, 24, 26, 27, 28, 33, 39, 58, 86, 98, 100, 132 and 142, C. I. Direct Reds 4, 17, 28, 37, 63, 75, 79, 80, 81, 83 and 254, C. I. Direct Violets 47, 48, 51, 90 and 94, C. I. Direct Blues 1, 6, 8, 15, 22, 25, 71, 76, 80, 86, 87, 90, 106, 108, 123, 163, 165, 199 and 226, C. I. Direct Greens 1, 26, 28, 59, 80 and 85, and the like; acid dyes such as C. I. Acid Yellows 3, 11, 17, 19, 23, 25, 29, 38, 42, 49, 59, 61, 71 and 72, C. I. Acid Reds 1, 6, 8, 18, 32, 35, 37, 42, 52, 85, 88, 115, 133, 134, 154, 186, 249, 289 and 407, C. I. Acid Violets 10, 34, 49 and 75, C. I. Acid Blues 9, 22, 29, 40, 59, 62, 93, 102, 104, 112, 113, 117, 120, 167, 175, 183, 229 and 234, C. I. Acid Greens 3, 5, 9, 12, 15, 16, 19, 25, 27, 28, 36, 40, 41, 43, 44, 56, 73, 81, 84, 104, 108 and 109, and the like; basic dyes such as C. I. Basic Yellow 40, C. I. Basic Reds 9, 12 and 13, C. I. Basic Violets 7, 14, and 27, C. I. Basic Blues 1, 3, 5, 7, 9, 24, 25, 26, 28 and 29, C. I. Basic Greens 1 and 4, and the like; and reactive dyes such as C. I. Reactive Yellow 2, C. I. Reactive Reds 4, 23, 24, 31 and 56, C. I. Reactive Blues 7, 13 and 49, C. I. Reactive Greens 5, 6, 7, 8, 12, 15, 19 and 21, and the like.

In addition, examples of the pigment include, but are not limited to, C. I. Pigment Yellows 1, 2, 3, 13, 16, 74, 83, 93, 128, 134 and 144, C. I. Pigment Reds 5, 7, 12, 23, 48 (Mn), 57 (Ca), 112, 122, 144, 170, 177, 221, 254 and 264, C. I. Pigment Violets 19, 23 and 48 (Ca), C. I. Pigment Blues 1, 2, 3, 15, 15:1, 15:2, 15:3, 15:4, 15:5, 15:6, 16, 17:1, 22, 27, 28, 29, 36 and 60, C. I. Pigment Green 7, and the like.

Water soluble dye or pigment may be employed as the coloring agent of the black ink, and a proper combination thereof may also be employed. Examples of the water soluble dye include, but are not limited to: direct dyes such as C. I. Direct Blacks 17, 19, 32, 51, 71, 108, 146, 154 and 168, and the like; acid dyes such as C. I. Acid Blacks 2, 7, 24, 26, 31, 52, 63, 112 and 118, and the like; basic dyes such as C. I. Basic Black 2, and the like; C. I. Food Blacks 1 and 2, and the like. Examples of the pigment which can be employed include carbon blacks such as MA8, MA100 (products of Mitsubishi Chemical Corporation), and color black FW200 (product of Degussa). A self-dispersing type carbon black which can disperse in water without using a dispersing agent may be employed as the carbon black. A self-dispersing type carbon black can be obtained by subjecting a carbon black to a surface treatment such that at least one hydrophilic group such as a carbonyl group, a carboxyl group, a hydroxyl group, or a sulfone group or a salt thereof is bound to the surface of the carbon black. Specific examples of the surface treatment include a method disclosed in U.S. Pat. No. 5,609,671 and a method disclosed in WO97/48769. Alternatively, a commercial product such as CAB-O-JET (a registered trade mark) 200, 300 (products of Cabot Corporation) or BONJET (a registered trade mark) CW1 (product of Orient Chemical Industries, Ltd.) may be employed as the self-dispersing black pigment.

The amount of the water soluble dye contained in the dye ink depends on the desired printing density and the desired color. If the amount is too low, the color is not satisfactorily developed on a recording material. On the other hand, if the amount is too high, a nozzle of an ink-jet head tends to be clogged. Thus, the amount of the water soluble dye with respect to the total weight of the corresponding ink is preferably about 0.1 wt. % to about 15 wt. %, more preferably about 0.3 wt. % to about 10 wt. %, and particularly preferably about 0.5 wt. % to about 5.0 wt. %.

The amount of the pigment contained in the pigment inks depends on the desired printing density and the desired color. If the amount is too low, the color is not satisfactorily developed on a recording material. On the other hand, if the amount is too high, a nozzle of an ink-jet head tends to be clogged. Thus, the amount of the pigment with respect to the total weight of the corresponding ink is preferably about 0.2 wt. % to about 15 wt. %, and more preferably about 0.2 wt. % to about 10 wt. %.

Preferably, the water employed in the inks is deionized water. The amount of the water is determined based on the kind of the water soluble organic solvent, the composition of the ink and the desired ink properties. If the amount of the water is too low, the viscosity of the ink increases to cause difficulty in ejecting the ink from a nozzle of an ink-jet head. On the other hand, if the amount is too high, the coloring agent is precipitated or aggregated due to the evaporation of water, and thus a nozzle of an ink-jet head tends to be clogged. Therefore, the amount of the water with respect to the total weight of the corresponding ink is preferably about 10 wt. % to about 95 wt. %, more preferably about 10 wt. % to about 90 wt. %, and particularly preferably about 20 wt. % to about 80 wt. %.

The water soluble organic solvents employed in the inks are broadly categorized into a humectant and a penetrant.

The humectant is added to the ink for preventing clogging of a nozzle of an ink-jet head. Specific examples of the humectant include, but are not limited to, water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like. If the amount of the water soluble organic solvent serving as the humectant is too low, the clogging of a nozzle of an ink-jet head is not satisfactorily prevented. On the other hand, if the amount is too high, the viscosity of the ink increases to cause difficulty in ejecting. Therefore, the amount of the water soluble organic solvent with respect to the total weight of the corresponding ink is preferably about 5 wt. % to about 50 wt. %, more preferably about 5 wt. % to about 40 wt. %, and particularly preferably about 5 wt. % to about 35 wt. %.

The penetrant is added to the ink for allowing the ink to rapidly penetrate into paper upon printing. Specific examples of the penetrant include glycol ethers typified by ethylene glycol-based alkyl ethers, propylene glycol-based alkyl ethers and the like. Specific examples of the ethylene glycol-based alkyl ether include, but are not limited to, ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Specific examples of the propylene glycol-based alkyl ether include, but are not limited to, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol-n-ethyl ether, tripropylene glycol-n-propyl ether, tripropylene glycol-n-butyl ether and the like.

If the amount of the water soluble organic solvent serving as the penetrant is too low, the penetrability is unsatisfactory. On the other hand, if the amount is too high, the penetrability becomes excessively high, and thus blurring such as feathering tends to occur. Therefore, the amount of the water soluble organic solvent with respect to the total weight of the corresponding ink is preferably about 0.1 wt. % to about 10 wt. %, and more preferably about 0.1 wt. % to about 5 wt. %.

In addition to the above-described humectant and penetrant, the inks constituting the ink set of the present invention may contain a water soluble organic solvent to prevent drying of ink at the tip of an ink-jet head, to enhance printing density, and to help the development of vivid colors. Examples of such a water soluble organic solvent include, but are not limited to: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; 2-pyrrolidone; N-methyl-2-pyrrolidone; 1,3-dimethyl-2-imidazolidinone; and the like.

Moreover, other conventionally known surfactants; viscosity modifiers such as polyvinyl alcohol, cellulose, water soluble resin and the like; surface tension modifiers; mildewproofing agents; or the like may be added to the inks constituting the ink set of the present invention in accordance with need.

The ink-jet recording method of the present invention performs ink-jet recording by use of the ink set of the present invention. No particular limitation is imposed on the type of the ink-jet recording method. Examples of the ink-jet recording method include, but are not limited to, an electrostatic attraction method, a method using a piezoelectric element, and a thermal method.

In the ink-jet recording method of the present invention, the light magenta pigment ink may be employed on a recording part in a recording material together with the red dye ink. In this case, the use ratio of the light magenta pigment ink to the red dye ink (i.e., the volume percentage of the light magenta pigment ink with respect to the red dye ink) is preferably about 25% or more and about 75% or less. A use ratio of the light magenta pigment ink of less than about 25% is not preferable, since an improving effect on light fastness of red color is low. In addition, a use ratio of the light magenta pigment ink of exceeding about 75% is not preferable, since the tone of red color is evidently changed. Of course, for colors which can be developed by the light magenta pigment ink alone, the red dye ink may not be employed together therewith.

In the ink-jet recording method of the present invention, when the light magenta pigment ink is employed on a recording material together with the red dye ink, the landing order of the inks is not particularly limited so long as the tone of the desired color can be reproduced. However, if the light magenta pigment ink is allowed to land in a superposing manner on a part recorded with the red dye ink, the light fastness is improved. This is because the amount of light reaching the dye molecules present in the lower layer decreases, since the pigment is present on the surface of the printed object. For a similar reason, the amount of oxides such as ozone which attack the dye molecules present in the lower layer decreases, thereby improving the gas resistance. On the other hand, if the red dye ink is allowed to land in a superposing manner on a part in a recording material on which part the light magenta pigment ink lands in advance, the color developing properties are improved by the light transparency of the dye molecules.

EXAMPLES

The present invention will next be specifically described by way of Examples and Comparative Examples. In the present Examples, "%" refers to weight % unless otherwise specified.

Examples 1 to 5 and Comparative Examples 1 to 7

(1) Preparation of Pigment Inks

Light magenta pigment ink 1 was prepared as follows.

First, 15 parts by weight of C. I. Pigment Red 122, 5 parts by weight of polyoxyethylene lauryl ether ammonium sulfate (average polymerization degree of oxyethylene=12), 15 parts by weight of glycerin and 65 parts by weight of water (ion exchanged water) were mixed. Subsequently, the mixture was subjected to a dispersion treatment by means of a wet sand mill using zirconia beads having a diameter of 0.3 mm as a medium to thereby obtain 100 parts by weight of a magenta pigment dispersion.

Separately, 52.3 parts by weight of water (ion exchanged water), 23.7 parts by weight of glycerin and 2 parts by weight of dipropylene glycol-n-propyl ether (hereinafter referred to as DPGPE) were mixed to prepare 78 parts by weight of an ink solvent. Subsequently, 22 parts by weight of the above-described magenta pigment dispersion was weighed out from 100 parts by weight thereof, and 78 parts by weight of the prepared ink solvent was gradually added thereto under stirring. The mixture was continued to stir for 30 minutes and filtrated with a membrane filter having a pore size of 1 μm to prepare light magenta pigment ink 1. The blending amount of C. I. Pigment Red 122 with respect to the total weight of the ink was 3.3 wt. %.

The same procedure as in the case of light magenta pigment ink 1 was repeated except that the ink composition was changed as shown in Table 1 to prepare light magenta pigment inks 2 and 3, and a normal magenta pigment ink.

(2) Preparation of Dye Inks

Red dye ink 1 was prepared as follows.

First, 68.5 parts by weight of water, 27 parts by weight of glycerin and 2 parts by weight of DPGPE were mixed to prepare 97.5 parts by weight of an ink solvent. Subsequently, 2.5 parts by weight of a red water soluble dye (C. I. Direct Red 254) was added to 97.5 parts by weight of the ink solvent under stirring. The mixture was continued to stir for 30 minutes and filtrated with a membrane filter having a pore size of 1 μm to prepare red dye ink 1.

The same procedure as in the case of red dye ink 1 was repeated except that the ink composition was changed as shown in Table 1 to prepare a red dye ink 2, a normal magenta dye ink, light magenta dye inks 1 and 2 and a yellow ink.

(3) Determination of L*, a*, b*, C* and h

Each of the inks was filled into a predetermined ink cartridge, and the ink cartridge was attached to a digital multifunction device equipped with an ink-jet printer (MFC-5200J, product of Brother Industries, Ltd.). Subsequently, an object was solidly printed with the ink at a resolution of 1,200×1,200 dpi on glossy paper (KASSAI (a registered trade mark) glossy finishing, product of FUJI Photo Film Co., Ltd.). The solidly printed object was measured for L*, a* and b* by means of Spectrolino (product of Gretag Macbeth) (light source: $D_{65}$, viewing angle: 2°).

The values of C* and h were calculated according to the following equations (1) and (2) using the obtained measurement values. The results are shown in Table 1.

$$C^* = \sqrt{(a^*)^2 + (b^*)^2} \quad \text{Equation (1)}$$

$$h = \tan^{-1}\left(\frac{b^*}{a^*}\right) \text{(when } a^* \geq 0 \text{ and } b^* \geq 0\text{)} \quad \text{Equation (2)}$$

$$h = 360 + \tan^{-1}\left(\frac{b^*}{a^*}\right) \text{(when } a^* \geq 0 \text{ and } b^* < 0\text{)}$$

$$h = 180 + \tan^{-1}\left(\frac{b^*}{a^*}\right) \text{(when } a^* < 0\text{)}$$

(4) Configuration of Ink Sets

The inks shown in Table 1 were combined as shown in Table 2 to configure water-based ink sets for ink-jet recording. Comparative Example 5 corresponds to a conventional ink set.

(5) Evaluation of Ink Sets

For each of the ink sets shown in Table 2, the inks constituting the ink set were filled into predetermined ink cartridges, and the ink cartridges were attached to a digital multifunction device equipped with an ink-jet printer (MFC-5200J, product of Brother Industries, Ltd.). Subsequently, a gradation sample and a print pattern sample were printed on glossy paper (KASSAI (a registered trade mark) glossy finishing, product of FUJI Photo Film Co., Ltd.). The gradation sample was employed for graininess, light fastness and gas resistance evaluations of magenta color and was printed for each of the magenta inks (the light magenta pigment ink, the light magenta dye ink, the normal magenta pigment ink and the normal magenta dye ink). The print pattern sample was employed for color reproducibility evaluation of red and magenta colors. Also, this print pattern sample contained patches having various hues which were obtained by changing the mixing ratio of the yellow ink, the red dye ink and the magenta ink (the light magenta pigment ink, the light magenta dye ink, the normal magenta pigment ink or the normal magenta dye ink).

The patches of each of the obtained samples were measured for a*, b* and L* by means of the same method as above. Subsequently, (a) graininess evaluation of magenta color, (b) evaluation of red color reproducibility, (c) evaluation of magenta color reproducibility, (d) evaluation of light fastness of a magenta color-printed part, (e) evaluation of gas resistance of a magenta color-printed part and (f) overall evaluation were performed for each of the ink sets as follows.

(a) Graininess Evaluation of Magenta Color

The patch for L*=90 in the above gradation sample was visually observed, and the graininess of magenta color was evaluated according to the following criteria. The evaluation results are shown in Table 2.

A: Graininess is not found.
B: Graininess is hardly noticeable.
C: Graininess is noticeable. Practically problematic.

(b) Evaluation of Red Color Reproducibility (b-1) Visual Evaluation

A patch having a hue angle (h) of 33°±10° was selected from the above-mentioned print pattern sample. Here, the above hue angle (h) corresponds to red color. The selected red color patch was visually observed to evaluate, based on the following criteria, whether or not the red color was satisfactorily developed. The evaluation results are shown in Table 2.

A: High-density red color is satisfactorily developed.
B: High-density red color is developed.
C: High-density red color is not satisfactorily developed.

(b-2) Chroma (C*) and lightness difference (ΔL*)

A patch having a hue angle (h) of 33°±10° was selected from the above print pattern sample. Here, the color having the above hue angle (h) is categorized as red color. The selection was made such that the selected patch had a hue angle (h) closest to that of the patch showing the red color printed by use of a conventional ink set; i.e., the patch of Comparative Example 5 (h=33°, L*=50). Subsequently, the chroma (C*) was calculated according to equation (1) above for each selected patch.

The lightness difference (ΔL*) between each selected patch and the patch of Comparative Example 5 was calculated according to the following equation (3). The larger value of the lightness difference (ΔL*) represents that high-density red color is less satisfactorily developed.

$$\Delta L^* = L^*_2 - L^*_1 \quad \text{Equation (3)}$$

$L^*_1$: L* of Comparative Example 5
$L^*_2$: L* of Examples and Comparative Examples (c) Evaluation of Magenta Color Reproducibility (c-1) Visual Evaluation A patch having a hue angle (h) of 359°±10° was selected from the above-mentioned print pattern sample. Here, the above hue angle (h) corresponds to magenta color. The selected magenta color patch was visually observed to evaluate, based on the following criteria, whether or not the magenta color was satisfactorily developed. The evaluation results are shown in Table 2.

A: High-density magenta color is satisfactorily developed.
B: Color close to high-density magenta color is developed.
C: High-density magenta color is not satisfactorily developed.

(c-2) Chroma (C*) and Lightness Difference (ΔL*)

A patch having a hue angle (h) of 359°±10° was selected from the above print pattern sample. Here, the color having the above hue angle (h) is categorized as magenta color. The selection was made such that the selected patch had a hue angle (h) closest to that of the patch showing the magenta color printed by use of the conventional ink set; i.e., the patch of Comparative Example 5 (h=359°, L*=49). Subsequently, the chroma (C*) was calculated according to equation (1) above for each selected patch. Further, the lightness difference (ΔL*) between each selected patch and the patch of Comparative Example 5 was calculated according to the above equation (3). The larger value of the lightness difference (ΔL*) represents that high-density magenta color is less satisfactorily developed.

(d) Evaluation of Light Fastness of a Magenta Color-Printed Part

A light fastness test was performed by use of the above gradation sample as follows.

The light fastness test was performed by means of a high energy xenon weather meter (SC750-WN, product of Suga Test Instruments Co., Ltd.). In this case, a xenon lamp was employed as a light source, and the test was performed under the conditions of a temperature of 25° C., a humidity of 50% RH, an irradiance of 35 W/m² (300 to 400 nm) and an irradiation time of 100 hours.

For a gradation sample having an OD value of 0.6 before the light fastness test, the OD value after the light fastness test was obtained. The OD values were obtained by use of the reflection densitometer RD-914 (product of Gretag Macbeth). An OD value reduction ratio with respect to the OD value (0.6) of the patch before the test was obtained from the following equation (4), and the obtained OD value reduction ratio was evaluated according to the following criteria. The evaluation results are shown in Table 2.

$$OD \text{ value reduction ratio}(\%) = \frac{OD_b - OD_a}{OD_b} \times 100 \quad \text{Equation (4)}$$

$OD_b$: OD value before test (=0.6)
$OD_a$: OD value after test

A: The OD value reduction ratio is less than 30%.
B: The OD value reduction ratio is 30% or more.

(e) Evaluation of Gas Resistance of a Magenta Color-Printed Part

An ozone resistance test as gas resistance evaluation was performed by use of the above gradation sample.

The ozone resistance test was performed by allowing a sample to stand under an atmosphere of an ozone concentration of 1 ppm, a chamber temperature of 24° C. and a humidity of 60% RH for 200 hours by use of the Ozone Weather Meter OMS-H (product of Suga Test Instruments Co., Ltd.).

For a gradation sample having an OD value of 0.6 before the ozone resistance test, the OD value after the ozone resistance test was measured by the same method as in the light fastness test. An OD value reduction ratio with respect to the OD value (0.6) of the patch before the test was obtained from the foregoing equation (4), and the obtained OD value reduction ratio was evaluated according to the following criteria. The evaluation results are shown in Table 2.

A: The OD value reduction ratio is less than 30%.
B: The OD value reduction ratio is 30% or more.

(f) Overall Evaluation

Overall evaluation was conducted based on the evaluation results of the ink set according to the following criteria. The results are shown in Table 2.

A: All of the evaluation results are rank A or rank B.
B: The evaluation results for the graininess evaluation of magenta color, the evaluation of red color reproducibility and the evaluation of magenta color reproducibility are rank A or rank B.
C: The evaluation results for the graininess evaluation of magenta color, the evaluation of red color reproducibility and the evaluation of magenta color reproducibility contain rank C.

TABLE 1

|  | Light magenta pigment ink 1 | Light magenta pigment ink 2 | Light magenta pigment ink 3 | Normal magenta pigment ink | Light magenta dye ink 1 | Light magenta dye ink 2 | Normal magenta dye ink | Red dye ink 1 | Red dye ink 2 | Yellow ink |
|---|---|---|---|---|---|---|---|---|---|---|
| Ink composition (wt. %) | | | | | | | | | | |
| C.I. Pigment Red 122 | 3.3 | 2.5 | 1.7 | 5.0 | — | — | — | — | — | — |
| C.I. Acid Red 52 | — | — | — | — | 1.6 | 1.3 | 2.5 | — | — | — |
| C.I. Direct Red 254 | — | — | — | — | — | — | — | 2.5 | — | — |
| C.I. Direct Red 81 | — | — | — | — | — | — | — | — | 2.5 | — |
| C.I. Direct Yellow 86 | — | — | — | — | — | — | — | — | — | 0.4 |
| C.I. Direct Yellow 132 | — | — | — | — | — | — | — | — | — | 1.6 |
| Glycerin | 27.0 | 27.0 | 27.0 | 27.0 | 27.0 | 27.0 | 27.0 | 27.0 | 27.0 | 27.0 |
| Dipropylene glycol-n-propyl ether | 2.0 | 2.0 | 2.0 | 2.0 | 2.0 | 2.0 | 2.0 | 2.0 | 2.0 | 2.0 |
| Polyoxyethylene lauryl ether ammonium sulfate (*1) | 1.1 | 0.8 | 0.6 | 1.7 | — | — | — | — | — | — |
| Water | 66.6 | 67.7 | 68.7 | 64.3 | 69.4 | 69.7 | 68.5 | 68.5 | 68.8 | 69.0 |
| Colorimetric system | | | | | | | | | | |
| L* | 51 | 55 | 65 | 46 | 51 | 54 | 49 | 32 | 41 | — |
| C* | 80 | 75 | 68 | 76 | 84 | 83 | 85 | 80 | 89 | — |
| h/° | 352 | 348 | 346 | 355 | 355 | 351 | 359 | 33 | 32 | — |

(*1) Average polymerization degree of oxyethylene = 12
*The ink composition (wt. %) represents the actual blending ratio of each ink component with respect to the total weight of an ink.

TABLE 2

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| Ink | | | | | | | | | | | | |
| Magenta ink | Light magenta pigment ink 1 | Light magenta pigment ink 2 | Light magenta pigment ink 1 | Light magenta pigment ink 2 | Light magenta pigment ink 3 | Light magenta dye ink 1 | Normal magenta pigment ink | Normal magenta pigment ink | Light magenta pigment ink 2 | Normal magenta dye ink | Normal magenta dye ink | Light magenta dye ink 2 |
| Red ink | Red dye ink 1 | Red dye ink 2 | Red dye ink 2 | Red dye ink 2 | Red dye ink 2 | — | Red dye ink 1 | — | — | Red dye ink 1 | — |  |
| Yellow ink | Yellow ink | Yellow ink | Yellow ink | Yellow ink | Yellow ink | Yellow ink | Yellow ink | Yellow ink | Yellow ink | Yellow ink | Yellow ink | Yellow ink |
| Evaluation | | | | | | | | | | | | |
| Graininess of magenta color | B | B | B | B | A | B | C | C | B | C | C | B |
| Red color reproducibility | | | | | | | | | | | | |
| Visual evaluation | A | A | A | A | A | A | B | A | C | B | A | C |
| L* | 32 | 32 | 41 | 41 | 41 | 32 | 53 | 32 | 60 | 50 | 32 | 56 |
| C* | 80 | 80 | 89 | 89 | 89 | 80 | 63 | 80 | 57 | 92 | 80 | 82 |
| h/° | 33 | 33 | 32 | 32 | 32 | 33 | 35 | 33 | 32 | 33 | 33 | 32 |
| Lightness difference (ΔL*) | −18 | −18 | −9 | −9 | −9 | −18 | −9 | −18 | 3 | Comparison reference | −18 | +6 |
| Magenta color reproducibility | | | | | | | | | | | | |
| Visual evaluation | A | A | A | A | B | A | A | A | C | A | A | C |
| L* | 42 | 45 | 46 | 48 | 49 | 44 | 46 | 46 | 55 | 49 | 49 | 55 |
| C* | 81 | 75 | 82 | 79 | 78 | 82 | 76 | 76 | 75 | 85 | 85 | 84 |
| h/° | 1 | 4 | 359 | 3 | 6 | 5 | 355 | 355 | 4 | 359 | 359 | 350 |
| Lightness difference (ΔL*) | −7 | −4 | −3 | −1 | ±0 | −5 | −3 | −3 | +6 | Comparison reference | ±0 | +6 |
| Light fastness of magenta color-printed part | A | A | A | A | A | B | A | A | A | B | B | B |
| Gas resistance of magenta color-printed part | A | A | A | A | A | B | A | A | A | B | B | B |

TABLE 2-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| Overall evaluation | A | A | A | A | A | B | C | C | C | C | C | C |

As shown in Table 2, in each of Examples 1 to 5, the graininess was not found or was hardly noticeable in a low-density printed part (L*=90) of magenta color, since the light magenta ink having a lightness (L*) of about 50 or more was employed. Also, since the red ink having a lightness (L*) of about 50 or less was employed, high-density red color was satisfactorily developed. In these Examples, although the light magenta ink having a low lightness (L*) of about 50 or more was employed, the red ink was also employed. Therefore, high-density magenta color could also be developed which was comparable to the magenta color which may be developed by a conventional ink set (Comparative Example 5). Further, since the coloring agent of the light magenta ink was pigment, the light fastness and the gas resistance were excellent in a magenta color-printed part.

Moreover, in each of Examples 1 to 5, red color can be developed by the red ink alone. Therefore, a landing error due to superposition was not generated in text printed in red color, thereby obtaining sharp printing quality.

In Comparative Example 1, the graininess was hardly noticeable in a low-density printed part (L*=90) of magenta color because the light magenta ink having a lightness (L*) of about 50 or more was employed. Also, since the red ink having a lightness (L*) of about 50 or less was employed, high-density red color was satisfactorily developed. In this case, although the light magenta ink having a low lightness (L*) of about 50 or more was employed, the red ink was also employed. Therefore, high-density magenta color could also be developed which was comparable to the magenta color which may be developed by the conventional ink set (Comparative Example 5). However, since the coloring agent of the light magenta ink was dye, the light fastness and the gas resistance were unsatisfactory in a magenta color-printed part.

In Comparative Example 2, since the normal magenta ink having a lightness (L*) of less than about 50 was employed, magenta color could be developed as comparable to that in the conventional ink set (Comparative Example 5). Also, since the coloring agent of the normal magenta ink was pigment, the light fastness and the gas resistance were improved in a magenta color-printed part. However, since the magenta ink was the normal magenta ink having a lightness (L*) of less than about 50, the graininess was noticeable in a low-density printed part of magenta color. In addition, since the red ink was not employed, the color reproduction range of red color was inferior to those of the ink sets of the present invention (Examples 1 to 5).

In Comparative Example 3, since the normal magenta ink having a lightness (L*) of less than about 50 was employed, magenta color could be developed as comparable to that in the conventional ink set (Comparative Example 5). Also, since the coloring agent of the normal magenta ink was pigment, the light fastness and the gas resistance were improved in a magenta color-printed part. Further, since the red ink having a lightness (L*) of about 50 or less was employed, high-density red color could be satisfactorily developed. However, since the magenta ink was the normal magenta ink having a lightness (L*) of less than 50, the graininess was noticeable in a low-density printed part of magenta color.

In Comparative Example 4, since the light magenta ink having a lightness (L*) of about 50 or more was employed, the graininess was unnoticeable in a low-density printed part (L*=90) of magenta color. Also, since the coloring agent of the light magenta ink was pigment, the light fastness and the gas resistance were improved in a magenta color-printed part. However, since the red ink was not employed, high-density red color was evidently insufficiently developed. In addition, since the red ink was not employed and also since the magenta ink was the light magenta ink having a lightness (L*) of about 50 or more, high-density magenta color was unsatisfactorily developed. Thus, the ink set of Comparative Example 4 was practically problematic.

Comparative Example 5 corresponds to the conventional ink set. Since the normal magenta ink having a lightness (L*) of less than about 50 was employed, the graininess was noticeable in a low-density printed part of magenta color. Also, since the coloring agent of the normal magenta ink was dye, the light fastness and the gas resistance were poor in a magenta color-printed part. Further, since the red ink was not employed, the color reproduction range of red color was inferior to those of the ink sets of the present invention (Examples 1 to 5).

In Comparative Example 6, since the normal magenta ink having a lightness (L*) of less than about 50 was employed, magenta color could be developed as comparable to that in the conventional ink set (Comparative Example 5). Also, since the red ink was employed in addition to the normal magenta ink, the color reproduction range of red color was larger than that of the conventional ink set (Comparative Example 5). However, since the magenta ink was the normal magenta ink having a lightness (L*) of less than 50, the graininess was noticeable in a low-density printed part of magenta color. Further, since the coloring agent of the normal magenta ink was dye, the light fastness and the gas resistance were poor in a magenta color-printed part.

In Comparative Example 7, the graininess was unnoticeable in a low-density printed part (L*=90) of magenta color because the light magenta ink having a lightness (L*) of about 50 or more was employed. However, the coloring agent of the light magenta ink was dye, the light fastness and the gas resistance were poor in a magenta color-printed part. Moreover, since the red ink was not employed, the color reproduction range of red color was narrower than that of the conventional ink set (Comparative Example 5), and the color reproduction range of high-density red color was unsatisfactory. In addition, since the red ink was not employed and also since the magenta ink was the light magenta ink having a lightness (L*) of about 50 or more, high-density magenta color was unsatisfactorily reproduced.

As described above, the ink sets of Examples 1 to 5 were superior to the ink sets of Comparative Examples 1 to 7 in terms of: reducing graininess in a low-density printed part of magenta color without reducing the color reproduction range of magenta color; extending the color reproduction range of red color; and improving the light fastness and gas resistance in a magenta color-printed part.

According to the water-based ink set for ink-jet recording of the present invention, the following can be achieved: the reduction of graininess in a low-density printed part in the magenta direction; the extension of color reproduction ranges; and the improvement of light fastness and gas resistance. Therefore, the ink set of the invention is useful when a color image is reproduced by a printer for ink-jet recording.

The entire disclosure of the specification, claims and summary of Japanese Patent Application No. 2005-246881 filed on Aug. 26, 2005 is hereby incorporated by reference.

What is claimed is:

1. A water-based ink set for ink-jet recording comprising a magenta pigment ink employing pigment as a coloring agent and a red dye ink employing dye as a coloring agent, wherein
the magenta pigment ink is a light magenta pigment ink having a lightness (L*) of about 50 or more in the L*a*b* colorimetric system.

2. The water-based ink set for ink-jet recording according to claim 1, wherein
a normal magenta ink having a lightness (L*) of less than about 50 in the L*a*b* colorimetric system is not included as the magenta pigment ink.

3. The water-based ink set for ink-jet recording according to claim 1, wherein
the light magenta pigment ink has the lightness (L*) in a range of from about 50 to about 65 in the L*a*b* colorimetric system.

4. The water-based ink set for ink-jet recording according to claims 1, wherein
the light magenta pigment ink has a hue angle (h) in ranges of from about 335° to about 360° or of from about 0° to about 5° in the L*a*b* colorimetric system.

5. The water-based ink set for ink-jet recording according to claim 1, wherein
the light magenta pigment ink has a chroma (C*) in a range of from about 65 to about 90 in the L*a*b* colorimetric system.

6. The water-based ink set for ink-jet recording according to claim 1, wherein
the red dye ink has a lightness (L*) of about 50 or less in the L*a*b* colorimetric system.

7. The water-based ink set for ink-jet recording according to claim 1, wherein
the red dye ink has a lightness (L*) in a range of from about 25 to about 50 in the L*a*b* colorimetric system.

8. The water-based ink set for ink-jet recording according to claim 1, wherein
the red dye ink has a hue angle (h) in a range of from about 200 to about 350 in the L*a*b* colorimetric system.

9. The water-based ink set for ink-jet recording according to claim 1, wherein
the red dye ink has a chroma (C*) in a range of from about 80 to about 90 in the L*a*b* colorimetric system.

10. The water-based ink set for ink-jet recording according to claim 1, further comprising a yellow ink and/or a cyan ink.

11. The water-based ink set for ink-jet recording according to claim 1, further comprising a black ink.

12. An ink-jet recording method employing the water-based ink set for ink-jet recording according to claim 1.

* * * * *

UNITED STATES PATENT AND TRADEMARK OFFICE
CERTIFICATE OF CORRECTION

PATENT NO. : 7,377,970 B2
APPLICATION NO. : 11/490944
DATED : May 27, 2008
INVENTOR(S) : Tomoyo Hamajima, Narumi Kawai and Narumi Koga It is certified that error appears in the above-identified patent and that said Letters Patent is hereby corrected as shown below:

Please correct Claim 8 of the issued patent so Claim 8 reads:

Col. 18, Claim 8. The water-based ink set for ink-jet recording according to claim 1, wherein the red dye ink has a hue angle (h) in a range of from about 20° to about 35° in the L*a*b* colorimetric system.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,377,970 B2 |
| APPLICATION NO. | : 11/490944 |
| DATED | : May 27, 2008 |
| INVENTOR(S) | : Tomoyo Hamajima, Narumi Kawai and Narumi Koga |

It is certified that error appears in the above-identified patent and that said Letters Patent is hereby corrected as shown below:

Please correct Claim 8 of the issued patent so Claim 8 reads:

Col. 18, Claim 8, lines 19-23. The water-based ink set for ink-jet recording according to claim 1, wherein the red dye ink has a hue angle (h) in a range of from about 20° to about 35° in the L*a*b* colorimetric system.

This certificate supersedes the Certificate of Correction issued November 18, 2008.

Signed and Sealed this

Ninth Day of December, 2008

JON W. DUDAS
*Director of the United States Patent and Trademark Office*